(12) United States Patent
Ledet

(10) Patent No.: US 9,924,317 B1
(45) Date of Patent: Mar. 20, 2018

(54) METHOD AND APPARATUS OF MODIFYING A DEVICE ACCORDING TO ACQUAINTANCE INFORMATION

(71) Applicant: Open Invention Network LLC, Durham, NC (US)

(72) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 0 days.

(21) Appl. No.: 14/630,975

(22) Filed: Feb. 25, 2015

Related U.S. Application Data

(63) Continuation of application No. 13/793,340, filed on Mar. 11, 2013, now Pat. No. 8,977,291, which is a continuation of application No. 13/222,684, filed on Aug. 31, 2011, now Pat. No. 8,472,976.

(60) Provisional application No. 61/379,066, filed on Sep. 1, 2010.

(51) Int. Cl.
  *H04W 8/04* (2009.01)
  *H04W 4/02* (2018.01)
  *H04L 29/08* (2006.01)

(52) U.S. Cl.
  CPC ............. *H04W 4/023* (2013.01); *H04L 67/18* (2013.01)

(58) Field of Classification Search
  CPC ..... G05B 19/4185; G05B 19/05; H04L 51/10; H04L 51/32; G06F 17/30038; G06F 17/21; G10L 21/10; H04N 9/79; H04H 20/57; G06K 9/00711
  USPC ...... 455/456.1, 418, 517; 709/204; 715/707; 701/208; 386/285; 705/14.58
  See application file for complete search history.

(56) References Cited

U.S. PATENT DOCUMENTS

| | | | | |
|---|---|---|---|---|
| 2005/0221841 A1* | 10/2005 | Piccionelli | ............ | H04W 48/04 455/456.3 |
| 2012/0054001 A1* | 3/2012 | Zivkovic | ............ | G06Q 30/0207 705/14.1 |
| 2013/0005360 A1* | 1/2013 | Issa | ........................ | H04H 20/57 455/456.3 |
| 2015/0154452 A1* | 6/2015 | Bentley | .............. | G06K 9/00711 386/201 |

* cited by examiner

*Primary Examiner* — Phuoc H Doan
(74) *Attorney, Agent, or Firm* — Haynes and Boone, LLP

(57) ABSTRACT

Disclosed are examples of modifying a current state of a mobile station based on the location of the mobile station with respect to a nearby acquaintance. The method may include detecting a presence of a mobile station in a predefined domain area identified by an application, the predefined domain area being associated with at least one acquaintance, and performing a modification to a current state of the mobile station based on a level associated with the at least one acquaintance.

21 Claims, 7 Drawing Sheets

METHOD AND APPARATUS OF MODIFYING A DEVICE ACCORDING TO ACQUAINTANCE INFORMATION

CROSS REFERENCE TO RELATED APPLICATIONS

This application is a continuation of application Ser. No. 13/793,340, entitled "METHOD AND APPARATUS OF MODIFYING A DEVICE ACCORDING TO ACQUAINTANCE INFORMATION", filed on Mar. 11, 2013, issued U.S. Pat. No. 8,977,291, issued on Mar. 10, 2015, which is a continuation of application Ser. No. 13/222,684, entitled "METHOD AND APPARATUS OF MODIFYING A DEVICE ACCORDING TO ACQUAINTANCE INFORMATION", filed on Aug. 31, 2011, issued U.S. Pat. No. 8,472,976, issued on Jun. 25, 2013, which in turn claims benefit of provisional application No. 61/379,066, entitled "MODIFYING A DEVICE ACCORDING TO INFORMATION ABOUT AN ACQUAINTANCE", filed on Sep. 1, 2010. This application is related to commonly assigned application Ser. No. 12/913,848, entitled "METHOD AND SYSTEM FOR GENERATING AN ELECTRONIC MEDIUM", filed on Oct. 28, 2010 and application Ser. No. 12/913,852, entitled "METHOD AND SYSTEM FOR SEARCHING NETWORK RESOURCES TO LOCATE CONTENT", filed on Oct. 28, 2010 and application Ser. No. 12/913,854, entitled "METHOD AND SYSTEM FOR PRIORITIZING CONTENT COLLECTED AUTOMATICALLY", filed on Oct. 28, 2010 and application Ser. No. 12/913,856, entitled "METHOD AND SYSTEM FOR COMMUNICATING WITH INTERNET RESOURCES TO IDENTIFY AND SUPPLY CONTENT FOR WEBPAGE CONSTRUCTION", filed on Oct. 28, 2010, issued U.S. Pat. No. 8,909,683, issued on Dec. 9, 2014 the entire contents of which are hereby incorporated by reference.

TECHNICAL FIELD OF THE INVENTION

This invention relates to a method and apparatus of implementing location based modifications to an end user device, and more particularly to initiating changes to the mobile device that will be brought to the attention of the user.

BACKGROUND OF THE INVENTION

It is without argument that people want to connect and stay connected with the people they know, otherwise referred to as their social network. Worldwide social networking accounts are on the rise. One study estimates that the current number of social networking accounts will rise from the current value of 2.2 billion to almost 3.7 billion by the year 2014. This includes all of the major social networking accounts.

Even businesses are taking advantage of the social network trend as well. Social networking sites are a way for small businesses to advertise for free, or for a very low cost. Companies utilize social networking to gain credibility, foster employee relationships, build a forum for communication with customers, and even boost sales.

Location based services (LBS) utilize GPS signals to track the location of users of mobile devices. LBS is included in advanced mobile devices often referred to as smartphones. The growth of smartphones is widespread, arguably attributed to the introduction of the iPhone® by Apple in 2007. The smartphone market has entered a significant growth spurt. With the use of smartphones, users have a device at their disposal that is capable of tracking themselves, as well as people in their social network. Users are able to obtain the latest information from their favorite social networking sites from almost any location, as well as input new data into their site via any of the known formats (e.g., video, pictures, and text).

However, there is still room for new technologies which provide alerting and other functions to the user in an intuitive way. Such notification systems or related alerting features may provide the user with real time updates regarding when there is an acquaintance nearby or there is an opportunity within reach to meet someone or to engage in an otherwise opportune experience within the user's domain area.

SUMMARY OF THE INVENTION

An example embodiment may provide a method that includes detecting a presence of a mobile station in a predefined domain area identified by an application, the predefined domain area being associated with at least one acquaintance. The method may also include performing a modification to a current state of the mobile station based on a level associated with the at least one acquaintance.

Another example embodiment of the present invention may include an apparatus that includes a memory configured to store acquaintance level information. The apparatus may also include a processor configured to detect a presence of a mobile station in a predefined domain area identified by an application, the predefined domain area being associated with at least one acquaintance, and perform a modification to a current state of the mobile station based on a level associated with the at least one acquaintance.

DETAILED DESCRIPTION OF THE INVENTION

Figure 1:
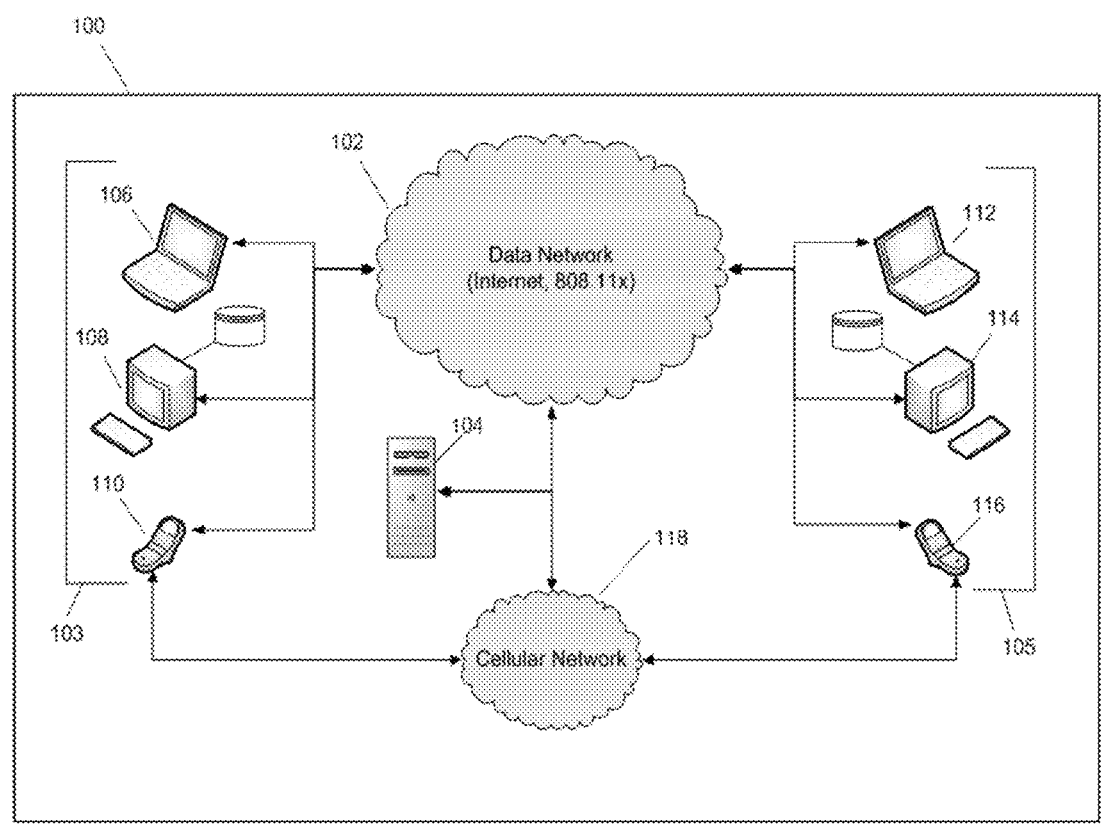
FIG. 1 illustrates an example communication network according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments provide enhanced functionality on a mobile device that is modified based on interactions with acquaintances included in the user's social network. In addition, the modifications may be based on those acquaintances who are within the user's immediate physical location or within a predefined geographical radius. The mobile device may be modified based on received signal to obtain the attention of the user. Some of the modifications may include a temperature change of the entire device, emitting scents, playing music, video and other forms of media among other modifications. For instance, a corresponding application may be enacted to gather data from the user's local and remote systems to further learn about the user's ever changing acquaintances. The data retrieved may be used to automatically adjust the user's social network according to interactions with the acquaintances.

The mobile device may be altered according to the location of acquaintances in the user's social network. Also the modifications to the mobile device may occur only if the acquaintances are within the immediate domain of the user. For example, groups of acquaintances (or tiers) are established with the application to aid in determining the level of the relationship between the acquaintance and the user. The types of modifications to the mobile device may include altering the temperature of the device, and emitting a scent from the device. other types of modifications are also possible.

In the user's first social network tier, for example, the user's family may be setup as profiles that are closest to the user. The second tier might be the user's closest friends. The third tier may be business and personal acquaintances, etc. When the user approaches a predetermined distance of a person who is in the user's acquaintance list, the device makes the user aware of the acquaintance's presence. The acquaintance's location may also be tracked dynamically using LBS or may be fixed location, such as their house, place of work, etc. As a result, the device visually indicates the presence by flashing an icon on the user's touch screen, playing an audio sound-clip to audibly notify the user, or any of the other normally used methods to alert the user of an event on the mobile device. In addition, the mobile device is altered according to specific parameters associated with that group or tier.

Each specific tier would have specific parameters allowing the mobile device to be altered dynamically for each tier of acquaintances. For example, the mobile device would raise the notification to a higher level of notification measures if a person in the first tier is in the user's current domain (i.e., geographical area radius) than if a person in the third tier was in the domain of the user. The same functionality may be applied to all modifications of the mobile device.

Example embodiments disclose procedures to provide altering modifications to a mobile device according to a location within a given domain. More specifically, the mobile device utilizing temperature modification technology, digital scent technology, and location-based services technology may alter a state of the mobile device to obtain the user's attention.

Example embodiments may utilize certain example technologies including but not limited to temperature modification, digital scent, and location based implementations to allow notifications to be customized and provide a dynamic approach to alerting the user via his or her smartphone. As a result, the user will be more attentive to the notification than if the notification did not implement the added technology.

Technology has progressed within the area of cooling internal components of a computing device due mostly to the fact that the internal processors have exponentially grown in speed thus generating more heat. Many various methods have been incorporated to cool internal components including air flow, which is the most common way to cool internal computer components. Such a cooling mechanism requires that flowing air be carried through the heart of the computer components.

Another example may include thermal electric component coolers, which are used as heat sinks paired with fans for more effective cooling ability than merely blowing air at a hot component. Yet another example may include liquid cooled internal and external radiators, these radiators use liquid to conduct the heat away from the component to an internal fan driven radiator.

Recently, the IEEE published research regarding the heat generated by a mobile device. Power dissipation levels in mobile electronics devices are heading towards five watts and above. With this power dissipation level, products such as mobile phones will require active cooling to ensure that the devices operate within an acceptable temperature envelop from both user comfort and reliability perspectives. It was noted that a centrifugal fan is implemented in certain mobile phones. Its performance was compared in terms of aerodynamic characteristics, maximum phone surface temperature, and allowable phone heat dissipation for various levels of blockage in the phone, which were simulated using perforated plates with varying porosity. The results indicated that with minimal blockage increased power dissipation levels were 75%, but with realistic blockages this value is more likely to be in the region of 50%.

According to another example, a heat pipe is a heat transfer mechanism that can transport large quantities of heat with a very small difference in temperature between the hot and cold interfaces. A typical heat pipe includes a sealed hollow tube made of a thermo-conductive metal, such as copper or aluminum. The pipe contains a relatively small quantity of a "working fluid" or coolant, such as water, ethanol or mercury with the remainder of the pipe being filled with the vapor phase of the working fluid, all other gases being excluded. The advantage of heat pipes is their great efficiency in transferring heat. These heat pipes are actually more "conductive" than a copper bar of equivalent cross-section.

According to another example, a Peltier cooling plate utilizes what is known as the Peltier effect to create a heat flux between the junction of two different types of materials. This effect is commonly used for cooling electronic components and small instruments. There are no moving parts and such a device is maintenance free. Due to the relatively low efficiency, thermoelectric cooling is generally only used in environments where the solid state nature outweighs the poor efficiency. Thermoelectric junctions are generally only around 10% as efficient as the ideal refrigerator (Carnot cycle), compared with 40% achieved by conventional compression cycle systems.

According to another example, a synthetic jet is produced by a continual flow of vortices that are formed by alternating brief ejection and suction of air across an opening such that the net mass flux is zero. A unique feature of these jets is that they are formed entirely from the working fluid of the flow system in which they are deployed, which can produce a net momentum to the flow of a system without net mass injection to the system. Synthetic jet air movers have no moving parts and are thus maintenance free. Due to the high heat transfer coefficients, high reliability but lower overall flow rates, synthetic jet air movers are usually used at the chip level and not at the system level for cooling. However depending on the size and complexity of the systems they can be used for both instances.

According to other example embodiments, a digital scent technology is part of the interactive entertainment experience. The basic idea is to scent-enable movies, games, music, animation, or any digital media. This technology is currently of interest in the computer industry, more specifically the mobile device industry. Example embodiments utilize the digital scent technology to aid in not only bringing attention to the user's mobile device, but aid in providing a more immersing experience that will further the interests of the user.

According to example embodiments, location based services (LBS) is an information and entertainment service, accessible with mobile devices through the mobile network utilizing the ability to make use of the geographical position of the mobile device. LBS services can be used in a variety of contexts, such as health, work, personal life, etc. LBS services include services to identify a location of a person or object, such as discovering the nearest banking cash machine or the whereabouts of a friend or employee. LBS services include parcel tracking and vehicle tracking services. LBS can include mobile commerce when taking the form of notifications directed at end users based on their current location including, for example, personalized weather services and even location-based games.

Some examples of locating methods currently utilized in LBS include control pane locating, sometimes referred to as positioning. This service utilizes the radio signal delay of the closest cell-phone towers for phones without GPS features, which can be quite slow as it uses the 'voice control' channel. Several examples can be used to find the location of the subscriber and are described below, for example, the simple and standard solution is GPS-based LBS. A current mobile device manufacturer's "NearMe" technology is one such example. It is used to maintain knowledge of the exact location of the mobile device. However, such LBS features can be expensive for the end-user, as they would have to invest in a GPS-equipped handset. GPS is based on the concept of tri-lateration, a basic geometric principle that allows finding one location if one knows its distance from other, already known locations.

Another example used to locate a mobile device is GSM localization. Determining the location of a mobile device in relation to its cell site is another way to find out the location of an object or a person. This example relies on multi-lateration of the signal from cell sites serving a mobile phone. The geographical position of the device is found out through various signal tracking techniques, such as time difference of arrival (TDOA) or enhanced observed time difference (E-OTD).

Another example is near LBS (NLBS), in which local-range technologies such as Bluetooth, WLAN, infrared and/or RFID/Near field communication technologies are used to match devices to nearby services. This application allows a person to access information based on their surroundings, especially suitable for use inside closed premises, and restricted areas. Another alternative is an operator and GPS-independent location service based on access into the deep level of the network. This solution enables accurate and quick determination of geographical coordinates of mobile phone numbers by providing operator-independent location data, which also works also for handsets that are not GPS-enabled.

The example embodiments of the current invention utilize LBS and LBA technologies in addition to other technical areas allowing location-based advertisements that are not only presented to the user of the mobile device at an ideal time, but which also allows the advertiser to "seize" the user's attention unlike before.

FIG. 1 depicts a network diagram of how the user application operates with relation to the cellular network and the Internet according to example embodiments. Referring to FIG. 1, the network allows a user utilizing a client machine 103 to access the current application to be downloaded from the server 104 or in a format that currently resides on the client's machine 103. The client machine 103 may be any of a mobile laptop device 106, a personal desktop computer 108, or a cellular device 110. The client machine 103 is connected to the Internet 102.

For the purposes of this disclosure, it is assumed that the application resides on the server 104. The user of the application will be accessing the client machine 103, and connecting to a remote machine 105. The remote machine 105 can be accessed via any of a mobile laptop device 112, a personal desktop computer 114, or a cellular device 116. The remote machine 105 is connected to the Internet 102. If the client is on a cellular device 110/116, the server 104 can be accessed via the Internet 102, or the cellular network 118. It should be noted that other types of devices, in addition to devices 103 and 105, might be used with the present invention. For example, a PDA, an MP3 player, a gaming device, a computing device, tablet computing device and smartphone, such as a hand held device or home based system may also be used to transmit and receive information associated with the user application.

The user will interface through a GUI that is accessed via one or more of the devices 103 (hereafter "mobile device 103"). In addition to the GUI located at the client's location, the application will communicate with functionality located on the server 104, for example, speech-to-text functionality, and the voice stress analysis functionality, through either the Internet 102, or the cellular network 118.

The user may configure the application preferably on a desktop computer, but may also configure the application on a mobile device that is Internet capable. It is necessary for the user to configure the groups of acquaintances for the application. The application utilizes acquaintances through social network applications subscribed to by the user. For example, in social networking sites, such as a Facebook® application, certain procedures are exposed in the published API giving the ability to examine all of the comments of users that are friends of a user on the Facebook application. The following are some of the methods within the Facebook API allowing this functionality: friends.get, returns the identifiers for the current user's Facebook friends, stream.getComments, returns all comments associated with a post in a user's stream, users.getInfo, returns a wide array of user-specific information for each user identifier passed, limited by the view of the current user, comments.add, adds a comment on behalf of a user.

Calls with a session secret may only act on behalf of the session user. Using these APIs and other published features, the user's friends are available for use by the current application. The user may select the friends and sort them into groups or tiers. These groups of people each cause different modifications to the user's mobile device.

Figure 2:
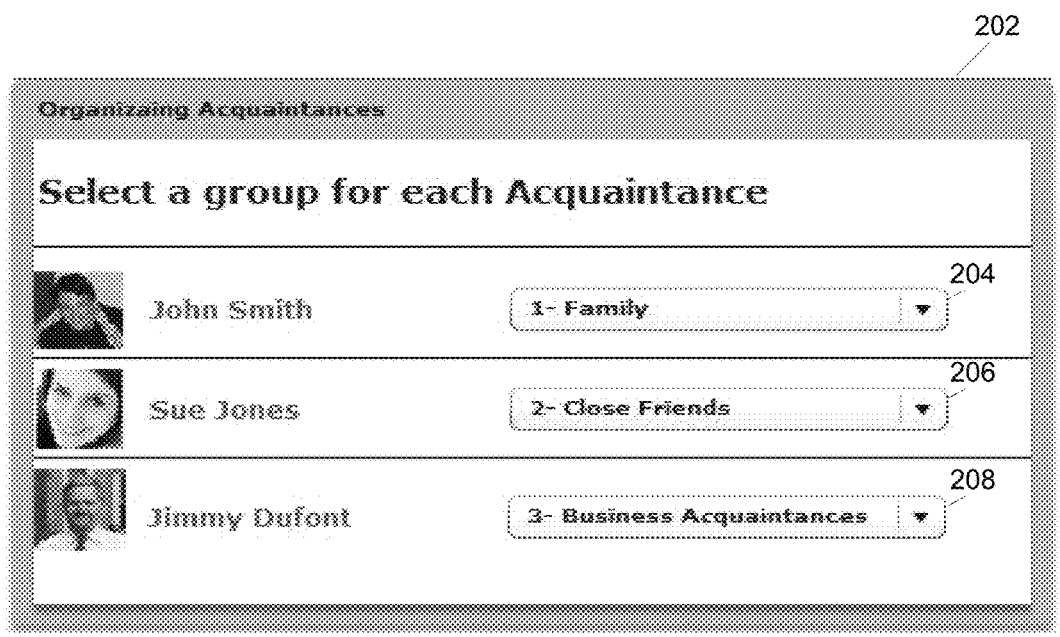
FIG. 2 illustrates an example GUI of a user acquaintance application according to example embodiments of the present invention.

FIG. 2 illustrates an example GUI of a user acquaintance application according to example embodiments of the present invention. Referring to FIG. 2, on the left, the user's acquaintances (3) are listed, along with a picture and a name of each individual. The acquaintances profile information would have been obtained through published APIs of social networking applications. With each acquaintance, a 'combo box' component is illustrated on the right that includes various options available for each user 204, 206 and 208. In the list for each of the combo box components are the groups defined by the application.

Figure 3:
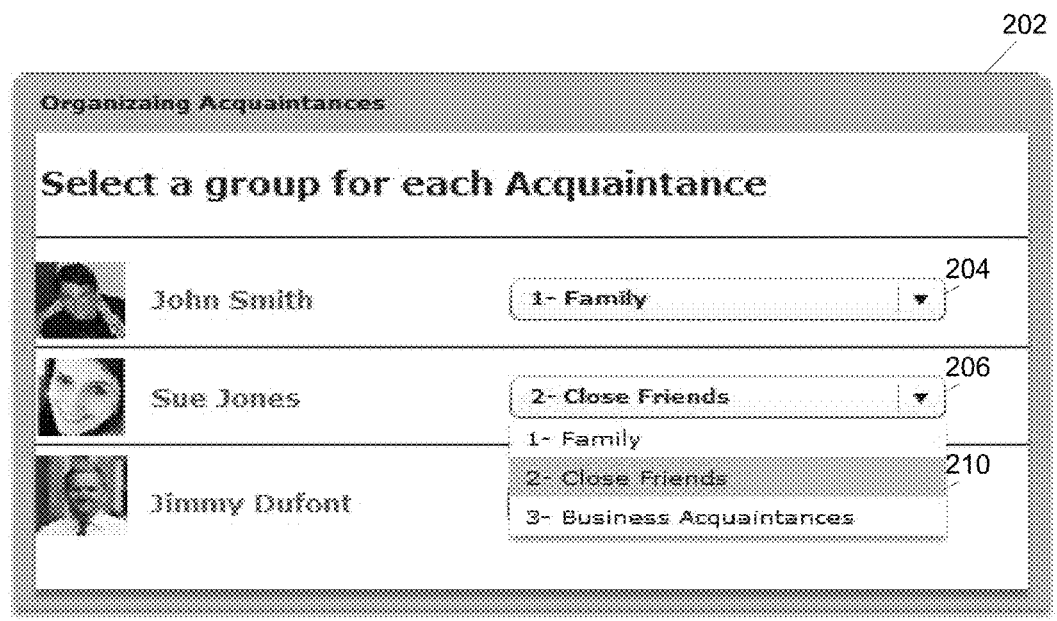
FIG. 3 illustrates another example GUI of a user acquaintance application according to example embodiments of the present invention.

FIG. 3 illustrates another example GUI of a user acquaintance application according to example embodiments of the present invention. In FIG. 3, a GUI illustrates the user accessing the second list element's combo box component 210. As can be seen, there are three groups (tiers) of acquaintances that are available for selection. The user would go through each of the listed acquaintances selecting the proper groups to assign to each of the respective acquaintances based on the user's preferences. Once the configurations of all of the user's acquaintances are placed into their respective groups or tiers, the application can then perform the correct action according to the user's acquaintances. In another embodiment of the current disclosure, the application groups the user's acquaintances automatically, determining the groups according to the previous interactions of the user with each individual acquaintance.

The application utilizes location based services (LBS) to alert the application that a mobile device has entered the domain of an acquaintance. LBS will associate the application with the device's geographic location by tracking the user's location coordinates and storing that information in memory for comparison to other locations authorized by the application. The mobile device combines the LBS functionality with mapping features on the device. In order for the LBS to be active on the mobile device, location services must also be active on the mobile device. This allows the mobile device 103 to synchronize with location satellites which provide location data from the geolocation service. This service cannot be turned on remotely, but only by the user of the mobile device 103.

Figure 4:
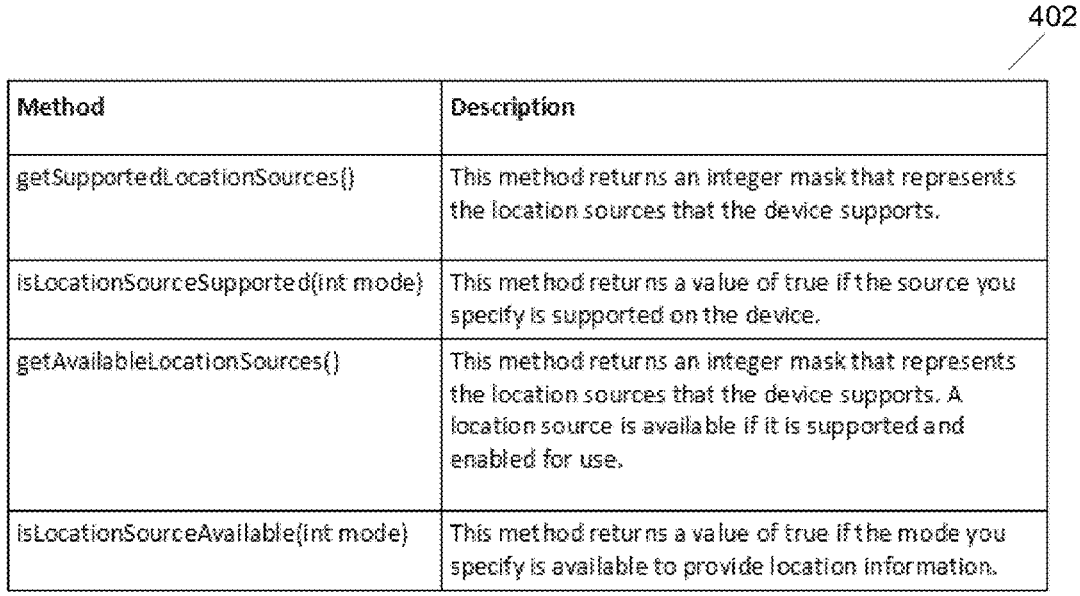
FIG. 4 illustrates an example table of application functions according to example embodiments of the present invention.

Some of the procedures available to query location sources are included in table 402 of FIG. 4. For example, getSupportedLocationSources( ), this procedure returns an integer mask that represents the location sources that the device supports. Another procedure includes isLocationSourceSupported(int mode), this procedure returns a value of true if the source you specify is supported on the device. Another procedure includes getAvailableLocationSources( ), this procedure returns an integer mask that represents the location sources that the device supports. A location source is available if it is supported and enabled for use. Another procedure includes isLocationSourceAvailable (int mode), this procedure returns a value of true if the mode you specify is available to provide location information.

In the above examples of FIG. 4, certain procedures listed are utilized to obtain the location sources for the mobile device. These sources are then used, in addition to GPS modes to query the location of the mobile device. The location of all of the mobile devices in the user's group list are maintained by the application, therefore the application will be aware of when the user enters the domain of a mobile device in the user's group list. The acquaintances' locations may be updated on an interval configured by the application. The default update is set to 5 minutes, but is configurable by the user (not depicted).

The mobile device 103 of the user of the current application is constantly aware of the location of the mobile device 103 assuming that the user has turned on location services. When the mobile device comes near the location of one of the user's acquaintances, the application is aware of the interaction as it is also tracking the location of the user's acquaintances. The user's domain or a predefine distance between the acquaintance and the user is configurable by the user of the application. The default setting is 20 meters but is configurable by the user of the application (not depicted). The domain can be set as low as 5 meters which is the minimal precision of mobile devices in general.

The user application may alter or modify the present status or current operating state of the user's mobile device 103 when the user and the acquaintance are identified by the application as having 'come in contact.' This may trigger an action that notifies the user of the recent action identified by the application (i.e., the user has entered a distance less than the predetermined distance assigned to the application parameters).

One of the modifications to the current operating state of the mobile device may be the emitting of a scent from the mobile device via one or more scent cards which are installed in the mobile device. Utilizing digital scent technology, the application of the current invention alters the current scent emitting from the mobile device, which is likely no scent at all. In one example, the digital scent cartridges are available that the user and may be inserted into the mobile device via a user initiated action. Heat generated from the mobile phone's battery or processor(s) may be used as a source of heat to release the scents through a vent in the mobile device. The action taken to release the scent may be controlled by commands transmitted to the mobile device via the application.

The user can assign a specific scent by configuring the scent from the scent cartridge in the mobile device. A different scent can be associated with each of the different levels of groups in the user's acquaintance list. For example, a flower scent can be associated with the user's first tier of acquaintances, the user's family. A second scent, perhaps a perfume scent can be associated with the user's second tier of acquaintances, and a third scent, a pine or forest scent, can be associated with the user's third tier of acquaintances.

In another example embodiment of the present invention, an initial release of the scent is emitted from the mobile device when the user enters the domain of an acquaintance. As the user moves closer to the acquaintance, the mobile device is instructed to make the intensity of the scent stronger. As the user moves further away from the acquaintance, the intensity of the scent is decreased. Such increases and decreases in the scent intensity may be made by increasing the amount of heat or decreasing the amount of heat applied to the scent cartridge in the mobile device 103.

The application may also alter the temperature of the mobile device when the user enters the domain of an acquaintance who is in the user's group(s). Utilizing heat generated from the battery of the mobile device 103, the application instructs the mobile device to become warmer, or utilizing cooling technology such as radiator fans or cooling plates, the application of the current can instruct the mobile device 103 to cool down according to the instructions from the application. The user can determine a specific temperature change by configuring the application manually and saving the preferred settings in memory. A different temperature change can be associated with each of the different levels of groups in the user's acquaintance list(s).

For example, a warming of the mobile device can be associated with the user's first and second tiers of acquaintances, and a cooling of the mobile device can be associated with the user's third tier of acquaintances. In another example, an initial temperature change occurs in the mobile device when the user enters a geographical domain of an acquaintance. As the user moves closer to the acquaintance, the mobile device is instructed to further alter the temperature change by increasing the temperature. As the user moves further away from the acquaintance the temperature change may decrease the temperature.

Figure 5:
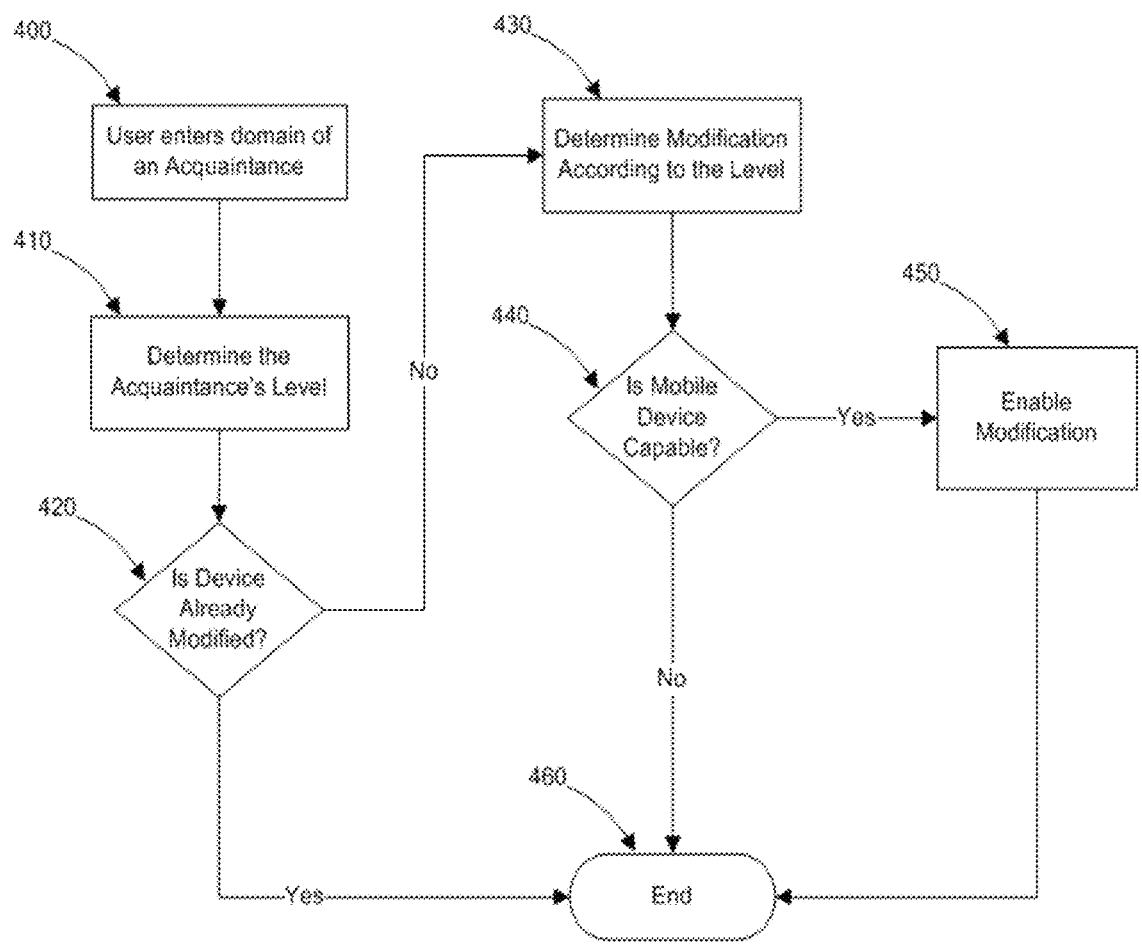
FIG. 5 illustrates an example flow diagram of a mobile device modification determination procedure according to example embodiments of the present invention.

FIG. 5 illustrates an example flow diagram of a mobile device modification determination procedure according to example embodiments of the present invention. Referring to FIG. 5, in the flow of operations represent an example of a user entering an acquaintance's domain. In operation, the user enters the domain of an acquaintance at operation 400. This occurs when the user moves within the predetermined distances associated with a domain radius or diameter that the user has configured for the acquaintances in the application. The application determines the level or tier that the acquaintance belongs to at operation 410. A first check is made to determine if the device is previously modified from another acquaintance 420. If the device is previously modified, then the process ends 460.

The application may limit the number of modifications to a mobile device at one time. For example, it does not make sense to heat up a mobile device and cool it at the same time. Nor does it make sense to emit a scent of a flower and a coffee bean at the same time. If the device is not previously modified, then the application determines the modifications that are desired at operation 440. The desired modifications may be based on a list of associations that have been selected by the user and stored in memory associated with the application. A check is made to determine if the mobile device 103 is capable of being modified according to the desired modifications 440. If the device is not capable of being altered, the process ends 460. For example, if the modification calls for a particular scent that is not installed in the user's mobile device then the modification will not be possible. However, if the device is capable of being modified then the device is modified according to the parameters set in the application 450, and the process ends 460.

In another example, the mobile device is capable of being modified multiple times. For instance, when more than one acquaintance is encountered within the user's domain, the mobile device is instructed to be modified with the most recently encountered acquaintance, and the previous modifications are disabled. In another example, a user's mobile device is modified following a voicemail from one of the acquaintances on the group list or from any acquaintance. When a voicemail is currently received on a mobile device, the device notifies the user by playing a sound bite, vibrating, message notification, or altering a visual aspect. In addition to the above notifications, the application performs actions similar to the user and an acquaintance coming near each other.

For example, if an acquaintance called the user of the mobile device 103 and left a voicemail, the application would determine if the mobile device 103 was previously modified. If not, then the application would determine the modification parameters for that acquaintance. If the mobile device 103 was capable of being modified in the manner respective of the modification parameters then the mobile device 103 will be modified.

In another example, the temperature of the mobile device 103 indicates the tone, or urgency of the voicemail left on the user's mobile device 103. The more urgent the message or the higher the tone of the message, the device becomes warmer. Applications that convert speech data to text are generally available in the market today. One example is Google Voice which converts voicemails left on a user's mobile device. Using such a speech to data converter, the voicemails are transcribed. These messages are parsed and compared to a group of words that may indicate a more urgent message. For example, the following list of words and phrases indicate urgency: quick, now, when you get this, as soon as possible, urgent, immediate, top-priority, vital, hurry, imperative, important, and serious.

If these words or synonyms are encountered in a voicemail left by an acquaintance in the user's group, it may indicate urgency, but not necessarily. There is more validation to occur prior to determining the urgency of the message. In addition to analyzing the voicemail for matching words, other speech analysis software applications are utilized to ascertain if the speaker in the voicemail is indeed leaving an urgent message.

Applications, such as the open source computerized voice stress analysis tool called 'LiarLiar' are used to detect stress in the speakers message as well as software applications to perform audio analysis using the discrete wavelet transform method. The frequency or pitch is also analyzed in these software applications. The combination of the words encountered in the message, and the speech analysis is used to determine the urgency of the message. The higher the urgency, the more temperature modification is applied to the mobile device 103.

Figure 6:
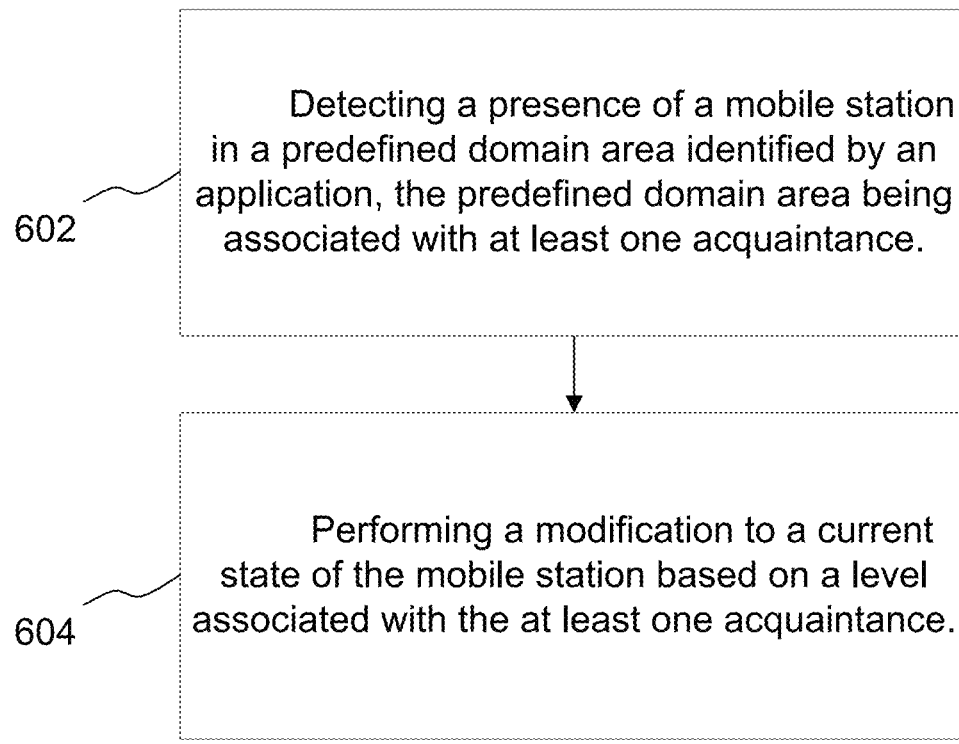
FIG. 6 illustrates a flow diagram according to example embodiments of the present invention.

FIG. 6 illustrates an example method of operation according to an example embodiment of the present invention. Referring to FIG. 6, the method may include detecting a presence of a mobile station in a predefined domain area identified by an application, the predefined domain area being associated with at least one acquaintance, at operation 602. The acquaintance may be the center of the predefined domain area and the mobile station's location may be determined to be within a radius of the area defined by the location of the acquaintance. The method may also include performing a modification to a current state of the mobile station based on a level associated with the at least one acquaintance, at operation 604. The level of the acquaintance may be determined ahead of time based on user defined preferences.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components of the other figures.

Figure 7:
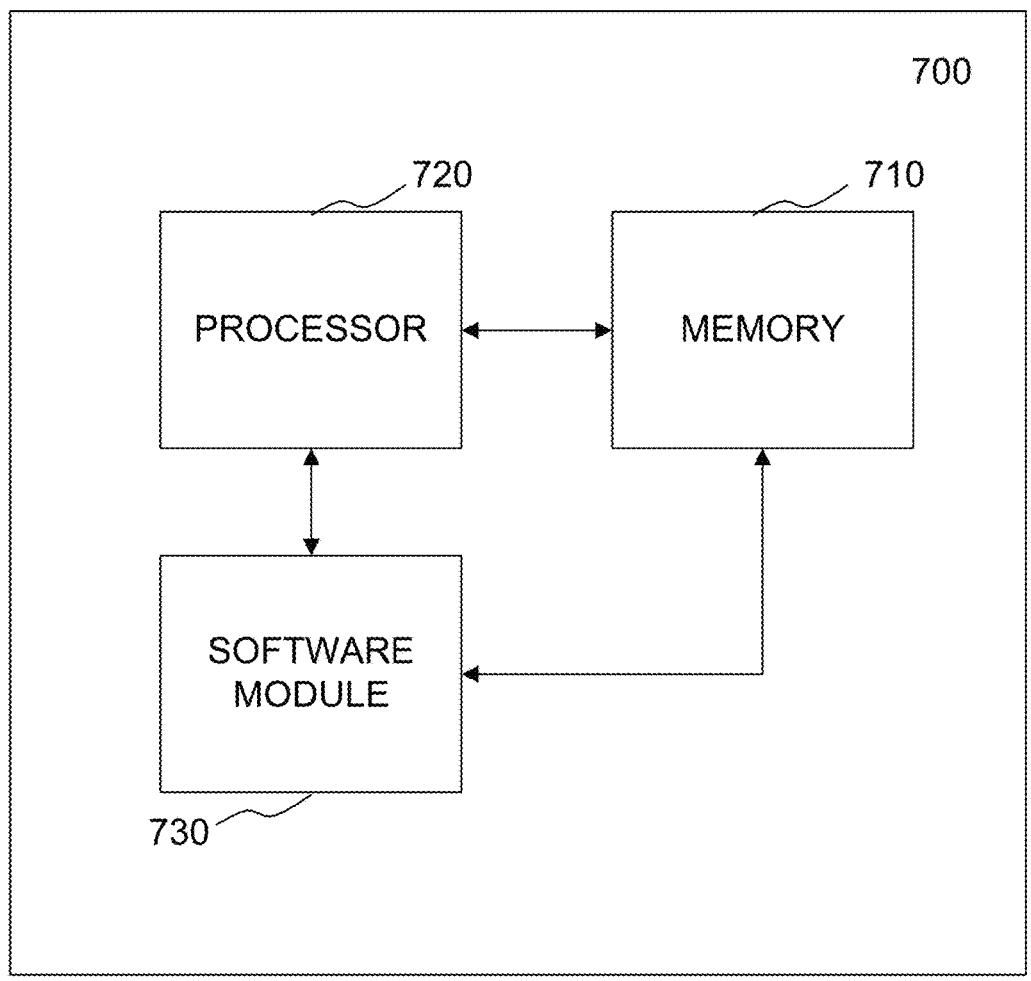
FIG. 7 illustrates a network entity that may include memory, software code and other computer processing hardware, and which may be configured to perform operations according to example embodiments of the present invention.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    determining that an acquaintance of a user is within a predetermined distance of a mobile station of the user, the acquaintance being designated by an application on the mobile station; and
    modifying a state of the mobile station differently based on which relationship type is indicated by the application, from among a plurality of relationship types, between the user of the mobile station and the acquaintance,
    wherein the modifying comprises at least one of a change in audio and a change in video of the mobile station.

2. The method of claim 1, further comprising detecting a presence of the mobile station in a predefined area associated with the acquaintance, wherein the presence of the mobile station is detected as being in the predefined area when the mobile station enters a predefined distance radius of a user device associated with the acquaintance.

3. The method of claim 1, wherein the modifying further comprises at least one of a change in scent and a change in temperature of the mobile station.

4. The method of claim 1, further comprising increasing an intensity of the modification to the state of the mobile station as the mobile station moves closer to a user device associated with the acquaintance.

5. The method of claim 1, further comprising decreasing an intensity of the modification to the state of the mobile station as the mobile station moves further from a user device associated with the acquaintance.

6. The method of claim 1, further comprising determining an acquaintance level of the association between the user and the acquaintance from among a plurality of acquaintance levels included in the application.

7. The method of claim 6, further comprising modifying the state of the mobile station based on a user defined modification that is associated with the determined acquaintance level.

8. The method of claim 1, wherein the relationship type between the user of the mobile station and the acquaintance comprises a personal relationship type, from among a plurality of personal relationship types, which is determined from a social networking application running on the mobile station.

9. An apparatus, comprising:
    a memory configured to store acquaintance information; and
    a processor configured to determine that an acquaintance of a user is within a predetermined distance of a mobile station of the user, the acquaintance being designated by an application on the mobile station, and to modify a state of the mobile station differently based on which relationship type is indicated by the application, from among a plurality of relationship types, between the user of the mobile station and the acquaintance,
    wherein the modifying comprises at least one of a change in audio and a change in video of the mobile station.

10. The apparatus of claim 9, wherein the processor is further configured to detect a presence of the mobile station in a predefined area associated with the acquaintance, wherein the presence of the mobile station is detected as being in the predefined area when the mobile station enters a predefined distance radius of a user device associated with the acquaintance.

11. The apparatus of claim 9, wherein the modifying further comprises at least one of a change in scent and a change in temperature of the mobile station.

12. The apparatus of claim 9, wherein the processor is further configured to increase an intensity of the modification to the state of the mobile station as the mobile station moves closer to a user device associated with the acquaintance.

13. The apparatus of claim 9, wherein the processor is further configured to decrease an intensity of the modification to the state of the mobile station as the mobile station moves further from a user device associated with the acquaintance.

14. The apparatus of claim 9, wherein the processor is further configured to determine an acquaintance level of the association between the user and the ene acquaintance from among a plurality of acquaintance levels included in the application.

15. The apparatus of claim 14, wherein the processor is further configured to perform the modification to the state of the mobile station based on a user defined modification that is associated with the determined acquaintance level.

16. A non-transitory computer readable storage medium configured to store instructions that when executed cause a processor to perform a method comprising:

determining that an acquaintance of a user is within a predetermined distance of a mobile station of the user, the acquaintance being designated by an application on the mobile station; and modifying a state of the mobile station differently based on which relationship type is indicated by the application, from among a plurality of relationship types, between the user of the mobile station and the acquaintance, wherein the modifying comprises at least one of a change in audio and a change in video of the mobile station.

17. The non-transitory computer readable storage medium of claim 16, wherein the processor is further configured to perform detecting a presence of a mobile station in a predefined area associated with the acquaintance, wherein the presence of the mobile station is detected as being in the predefined area when the mobile station enters a predefined distance radius of a user device associated with the acquaintance.

18. The non-transitory computer readable storage medium of claim 16, wherein the modifying further comprises at least one of a change in scent and a change in temperature of the mobile station.

19. The non-transitory computer readable storage medium of claim 16, wherein the processor is further configured to perform increasing an intensity of the modification to the state of the mobile station as the mobile station moves closer to a user device associated with the acquaintance.

20. The non-transitory computer readable storage medium of claim 16, wherein the processor is further configured to perform decreasing an intensity of the modification to the state of the mobile station as the mobile station moves further from a user device associated with the acquaintance.

21. The non-transitory computer readable storage medium of claim 16, wherein the processor is further configured to perform at least one of:

determining an acquaintance level of the association between the user and the acquaintance from among a plurality of acquaintance levels included in the application; and modifying the state of the mobile station based on a user defined modification that is associated with the determined acquaintance level.

* * * * *